(12) United States Patent
Takezawa et al.

(10) Patent No.: US 7,661,830 B2
(45) Date of Patent: Feb. 16, 2010

(54) LAMP DEVICE AND PROJECTOR EQUIPPED WITH THE SAME

(75) Inventors: Takeshi Takezawa, Matsumoto (JP); Shohei Fujisawa, Matsumoto (JP); Kazuhiro Tanaka, Minamiazumi-gun (JP); Hiroyuki Kobayashi, Matsumoto (JP); Toru Terashima, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 287 days.

(21) Appl. No.: 11/898,870

(22) Filed: Sep. 17, 2007

(65) Prior Publication Data

US 2008/0048563 A1    Feb. 28, 2008

Related U.S. Application Data

(63) Continuation of application No. 11/085,159, filed on Mar. 22, 2005, now abandoned.

(30) Foreign Application Priority Data

| Mar. 22, 2004 | (JP) | ............................. 2004-082135 |
| Nov. 19, 2004 | (JP) | ............................. 2004-335375 |

(51) Int. Cl.
*G03B 21/28* (2006.01)
*G03B 21/20* (2006.01)
*F21V 7/00* (2006.01)
*G02F 1/13357* (2006.01)

(52) U.S. Cl. .................... 353/99; 362/298; 362/346; 353/98

(58) Field of Classification Search .............. 353/98, 353/99; 362/297, 298, 304, 341, 346; 349/67
See application file for complete search history.

(56) References Cited

U.S. PATENT DOCUMENTS

| 5,491,525 | A | 2/1996 | Yamasaki et al. |
| 6,693,379 | B2 | 2/2004 | Nishida |
| 6,784,601 | B2 | 8/2004 | Kai et al. |
| 6,875,072 | B2 | 4/2005 | Nishida |
| 7,059,746 | B2 * | 6/2006 | Takezawa .................... 353/98 |

(Continued)

FOREIGN PATENT DOCUMENTS

JP    A 59-135406    8/1984

(Continued)

*Primary Examiner*—William C Dowling
(74) *Attorney, Agent, or Firm*—Oliff & Berridge, PLC

(57) ABSTRACT

Aspects of the invention can provide a lamp device that is capable of avoiding concentration of stresses in a sub-mirror fixing portion of an arc tube. The lamp device can include an arc tube provided with a bulb portion encapsulating inside a pair of electrodes, and a pair of sealing portions formed continuously from the bulb portion and sealing inside electrode axes having the electrodes at tip ends and conductor foils to bring the electrode axes into conduction, a main reflection mirror, to which the sealing portion is fixed, to reflect lights emitted from the arc tube toward an illuminated region, and a sub-mirror fixed to the sealing portion in such a manner that a reflection surface opposes the main reflection mirror with the bulb portion in between. The sub-mirror can be bonded with a bonding agent to a surface region of the sealing portion present in a direction moving away from the bulb portion in reference to a position corresponding to a termination of the electrode axis.

12 Claims, 3 Drawing Sheets

U.S. PATENT DOCUMENTS

| | | |
|---|---|---|
| 7,159,990 B2 | 1/2007 | Hashizume |
| 7,232,241 B2 * | 6/2007 | Takezawa ................... 362/302 |
| 7,247,071 B2 * | 7/2007 | Fujisawa et al. .............. 445/22 |
| 7,288,899 B2 * | 10/2007 | Akiyama ..................... 315/291 |
| 7,364,312 B2 * | 4/2008 | Akiyama ..................... 353/99 |
| 7,397,189 B2 * | 7/2008 | Kobayashi et al. .......... 313/601 |
| 7,461,954 B2 * | 12/2008 | Takezawa ................... 362/302 |
| 2002/0066519 A1 | 6/2002 | Polis et al. |
| 2003/0184200 A1 | 10/2003 | Ookahara et al. |
| 2004/0042212 A1* | 3/2004 | Du et al. ..................... 362/296 |
| 2005/0024879 A1* | 2/2005 | Takezawa ................... 362/341 |
| 2005/0190558 A1* | 9/2005 | Yanagisawa et al. ........ 362/296 |
| 2005/0213327 A1* | 9/2005 | Kobayashi et al. .......... 362/261 |
| 2006/0158079 A1 | 7/2006 | Ookahara et al. |
| 2007/0115439 A1 | 5/2007 | Takezawa |
| 2009/0080199 A1* | 3/2009 | Takezawa ................... 362/298 |

FOREIGN PATENT DOCUMENTS

| | | |
|---|---|---|
| JP | A 63-045043 | 2/1988 |
| JP | A 01-295961 | 11/1989 |
| JP | A 02-083574 | 3/1990 |
| JP | A 03-046786 | 2/1991 |
| JP | A 05-325909 | 12/1993 |
| JP | A-07-192688 | 7/1995 |
| JP | A07-218910 | 8/1995 |
| JP | A 8-31382 | 2/1996 |
| JP | A 9-120067 | 5/1997 |
| JP | A-10-134767 | 5/1998 |
| JP | A-10-289690 | 10/1998 |
| JP | A 10-311962 | 11/1998 |
| JP | A 10-332352 | 12/1998 |
| JP | A 11-143378 | 5/1999 |
| JP | A 2001-176303 | 6/2001 |
| JP | A 2002-015921 | 1/2002 |
| JP | A-2002-062586 | 2/2002 |
| JP | A 2003-036812 | 2/2003 |
| JP | A 2003-187747 | 7/2003 |
| JP | A 2004-039599 | 2/2004 |
| WO | WO 2004/020898 A1 | 3/2004 |

* cited by examiner

LAMP DEVICE AND PROJECTOR EQUIPPED WITH THE SAME

This is a Continuation of application Ser. No. 11/085,159 filed Mar. 22, 2005. The disclosure of the prior application is hereby incorporated by reference herein in its entirety.

BACKGROUND

Aspects of the invention can relate to a lamp device provided with a so-called sub-mirror, and a projector equipped with the lamp device.

Related art lamp devices in which an arc tube provided with a bulb portion encapsulated inside a pair of electrodes, and a pair of sealing portions formed continuously from the bulb portion and sealing inside electrode axes having the electrodes on the tip ends and conductor foils to bring the electrode axes into conduction, can be attached to the main reflection mirror. Some related art lamp devices, as described above, have been disclosed in which a sub-mirror is fixed to one sealing portion with a bonding agent in such a manner that its reflection surface is placed oppositely to the main reflection mirror with the bulb portion in between. See, for example JP-A-8-31382.

SUMMARY

In the related art, the fixing portion of the sub-mirror can be on the surface of the sealing portion corresponding to a portion in which the electrode axis is sealed. According to this structure in the related art, however, a stress induced from a difference of coefficients of thermal expansion between the sealing portion and the bonding agent is added to a stress induced from a difference of coefficients of thermal expansion between the electrode axis and the sealing portion. This raises a problem that stresses are concentrated in the sub-mirror fixing portion of the arc tube.

An object to propose a lamp device capable of avoiding concentration of stresses in the sub-mirror fixing portion of the arc tube and to propose a projector equipped with this lamp device.

An exemplary lamp device of the invention can include an arc tube provided with a bulb portion encapsulated inside a pair of electrodes, and a pair of sealing portions formed continuously from the bulb portion and sealing inside electrode axes having the electrodes at tip ends and conductor foils to bring the electrode axes into conduction, a main reflection mirror, to which one of the pair of sealing portions is fixed, to reflect lights emitted from the arc tube toward an illuminated region, and a sub-mirror, disposed on the other one of the pair of sealing portions in such a manner that the bulb portion is between said sub-mirror and said main reflection mirror, to return lights emitted from the bulb portion to the main reflection mirror. The lamp device is characterized in that the sub-mirror can be bonded with a bonding agent to a surface region of the sealing portion present in a direction moving away from the bulb portion in reference to a position corresponding to a termination of the electrode axis.

When configured in this manner, it is possible to separate a large stress region developed in a portion between the electrode axis and the sealing portion from a large stress region developed in a portion between the sealing portion and the bonding agent, both induced from a difference of coefficients of thermal expansion, and concentration of stresses in the sub-mirror fixing portion of the arc tube can be therefore avoided. It is thus possible to obtain a lamp device that is stable in terms of strength.

The sub-mirror is characterized in that it includes a cup-shaped reflection base portion on which the reflection surface is formed, and a cylinder portion extending from the reflection base portion in an opposite direction of a reflection direction of the reflection surface in such a manner that the sealing portion is inserted therein, and that it is fixed to the sealing portion by utilizing a terminal portion of the cylinder portion. When configured in this manner, it is possible to bond the sub-mirror onto the surface of the sealing portion present remote from a portion corresponding to the electrode axis while the reflection surface of the sub-mirror is placed in close proximity to the bulb portion, which makes it possible to maintain the outside shape of the sub-mirror small.

It is preferable that the cylinder portion is located inside virtual lines linking an outermost portion of the reflection base portion and a tip-end outside portion of the sealing portion to which the cylinder portion is fixed. When configured in this manner, it is possible to avoid blocking reflected lights from the main reflection surface by the cylinder portion.

An exemplary projector of the invention can include a light source, a light modulation device to form an image by modulating a light emitted from the light source according to image information, and a projection lens to project the image, and the projector is characterized in that any of the lamp devices described above is used as the light source. Because the projector uses any of the lamp devices as described above as the light source, the projector is improved in quality and the life thereof is extended.

BRIEF DESCRIPTION OF THE DRAWINGS

The invention will be described with reference to the accompanying drawings, wherein like numerals reference like elements, and wherein.

DETAILED DESCRIPTION OF EMBODIMENTS

Figure 1:
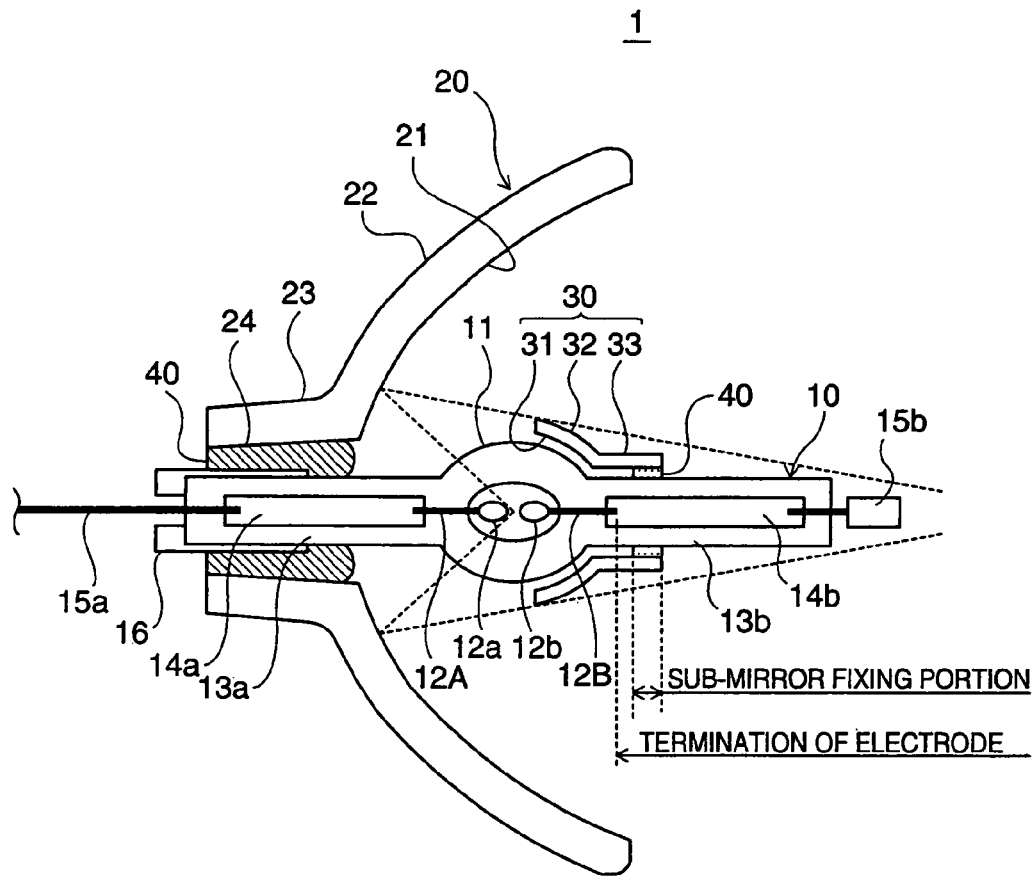
FIG. 1 is a cross section showing the configuration of a lamp device according to one exemplary embodiment of the invention.

FIG. 1 is a cross section showing the configuration of a lamp device 1 according to one exemplary embodiment of the invention. The lamp device 1 can include an arc tube 10, a main reflection mirror 20, and a sub-mirror 30.

The arc tube 10 is, for example, a high pressure mercury-vapor lamp, and is made of vitreous silica or the like. It can include a bulb portion 11 at the center, and a pair of sealing portions 13*a* and 13*b* formed continuously from the bulb portion 11, respectively, on the both sides of the bulb portion 11. Mercury, an inert gas, a small quantity of halogen, and the like are sealed inside the bulb portion 11, and discharging electrodes 12*a* and 12*b* are also encapsulated therein. In the sealing portions 13*a* and 13*b* are sealed, respectively, electrode axes 12A and 12B made of tungsten or the like and provided with electrodes 12*a* and 12*b* formed on the tip ends, and metal foils 14*a* and 14*b* made of molybdenum or the like serving as conductors to bring the electrode axes 12A and 12B into conduction. Power supply leads (wire or terminal) 15*a* and 15*b* from the metal foils 14*a* and 14*b* are drawn from the end surfaces of the sealing portions 13a and 13b, respectively. Herein, a mouth ring 16 is provided at the end of the sealing portion 13a to prevent light leakage or the like, however, it may be omitted without causing significant inconveniences. In addition, the arc tube 10 is not limited to a high pressure mercury-vapor lamp, and other types of lamp, such as a metal halide lamp and a xenon lamp, can be used as well. Further, the tip ends of the electrode axes 12A and 12B where the electrodes 12a and 12b are formed are assumed as the beginnings of the electrode axes 12A and 12B relative to the terminations of the electrode axes 12A and 12B described below.

The main reflection mirror 20 can include a reflection base portion 22 having a concave reflection surface 21 formed as a paraboloid of revolution or an ellipsoid of revolution, and a cylinder portion 23 used to fix one sealing portion 13a of the arc tube 10 inserted therein. The cylinder portion 23 is a cylindrical body extending from the centers of the reflection surface 21 and the reflection base portion 22 to the opposite side of the reflection surface 21, and has a through-hole 24 made inside to be coaxial with the center of rotation of the reflection surface 21. The reflection base portion 22 and the cylinder portion 23 are normally made of heat-resistant glass and formed integrally in the shape of a funnel. The arc tube 10 is fixed with a bonding agent 40 after the sealing portion 13a is inserted into the cylinder portion 23 of the main reflection mirror 20 from the reflection surface 21 side, so that the bulb portion 11 comes on the side of the reflection surface 21 of the main reflection mirror 20.

The sub-mirror 30 functions to reflect a light emitted from the bulb portion 11 to be returned to the main reflection mirror 20 via the bulb portion 11, and includes a cup-shaped reflection base portion 32 where a reflection surface 31 is formed, and a cylinder portion 33 formed to extend from the reflection base portion 32 in an opposite direction of the reflection direction of the reflection surface 31 so that the sealing portion 13b can be inserted therein.

The sub-mirror 30 is fixed to the sealing portion 13b of the arc tube 10 with the bonding agent 40 in such a manner that the reflection surface 31 opposes the reflection surface 21 of the main reflection mirror 20 with the bulb portion 11 of the arc tube 10 in between. It should be noted that the reflection base body 32 of the sub-mirror 30 is placed in close proximity to the outer peripheral surface of the bulb portion 11, so that the sub-mirror 30 will not block reflected lights from the main reflection mirror 20 as much as possible.

In addition, a surface region of the sealing portion 13b present in a direction moving away from the bulb portion 11 in reference to the position corresponding to the termination of the electrode axis 12B is allocated to the fixing portion of the sub-mirror 30 on the sealing portion 13b, so that the electrode axis 12B inside the sealing portion 13b will not overlap the fixing region of the sub-mirror 30 on the surface of the sealing portion 13b. In other words, the fixing portion of the sub-mirror 30 on the sealing portion 13b and the electrode axis 12B inside the sealing portion 13b are shifted to avoid coexistence within a plane perpendicular to the direction along which the sealing portion 13b extends from the bulb portion 11. Hence, the cylinder portion 33 of the sub-mirror 30 has a cylinder length starting from near the boundary between the bulb portion 11 and the sealing portion 13b and ending where it overlaps part of the metal foil 14b, and utilizes the terminal portion of the cylinder portion 33 as the fixing surface. The configuration as described above can separate a large stress region developed in a portion between the electrode axis 12B and the sealing portion 13b from a large stress region developed in a portion between the sealing portion 13b and the bonding agent 40, both induced from a difference of coefficients of thermal expansion. It should be noted, however, that it is preferable that the cylinder portion 33 of the sub-mirror 30 is located inside the virtual lines (see FIG. 3(b)) linking the outermost portion of the reflection base portion 32 and the tip-end outer portion of the sealing portion 13b to which the cylinder portion 33 is fixed. When configured in this manner, it is possible to avoid blocking reflected lights from the main reflection mirror 20 by the cylinder portion 33.

It is preferable to secure a clearance sufficient to adjust the positions of the light source image and the reflection image, that is, a clearance of 0.2 mm or greater, between the outer peripheral surface of the bulb portion 11 and the sub-mirror 30. When configured in this manner, heat release from the bulb portion 11 on the side covered with the sub-mirror 30 is ensured, which can in turn suppress a local temperature rise of the arc tube 10. In addition, because the sub-mirror 30 is exposed to high temperatures, it is preferable to manufacture the sub-mirror 30 with the use of a low-heat expansive admixture, such as quartz and neoceram, and a high-heat conductive material, such as light-transmissive alumina, sapphire, berg crystal, fluorite, and YAG. For example, Sumicorundum (a registered trademark of Sumitomo Chemical Co., Ltd.) may be used as light-transmissive alumina.

Figure 2:
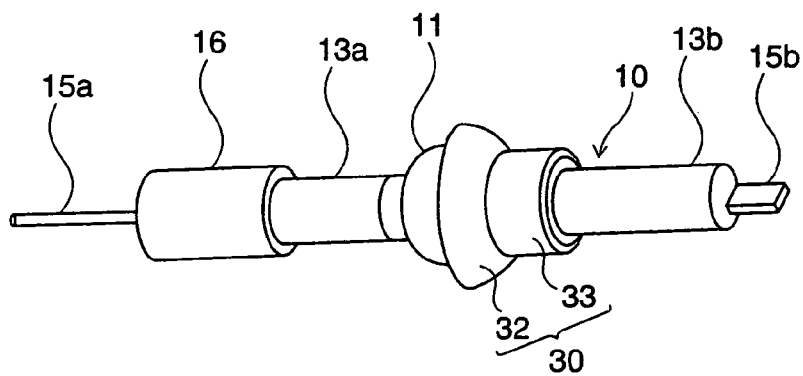
FIG. 2 is an outside view of an arc tube provided with a sub-mirror used in the lamp device of FIG. 1.

FIG. 2 is an outside view of the exemplary arc tube 10 attached with the sub-mirror 30. The lamp device 1 can be assembled by positioning the arc tube 10, to which the sub-mirror 30 has been previously attached, with respect to the main reflection mirror 20. An inorganic bonding agent based on silica or alumina can be used as the bonding agent 40 to fix the sub-mirror 30 to the sealing portion 13b of the arc tube 10 and the bonding agent 40 to fix the sealing portion 13a to the cylinder portion 23 of the main reflection mirror 20. A concrete example of such a bonding agent includes Sumiceram (a registered trademark of Sumitomo Chemical Co., Ltd.).

Advantages achieved by allocating the surface region of the sealing portion 13b present in a direction moving away from the bulb portion 11 in reference to the position corresponding to the termination of the electrode axis 12B to the fixing portion of the sub-mirror 30, so that the electrode axis 12B inside the sealing portion 13b will not overlap the fixing region of the sub-mirror 30 on the surface of the sealing portion 13b, will now be described. FIG. 3 is a view used to describe advantages of the lamp device 1 of the invention in comparison with a lamp device in the related art.

Figure 3A:
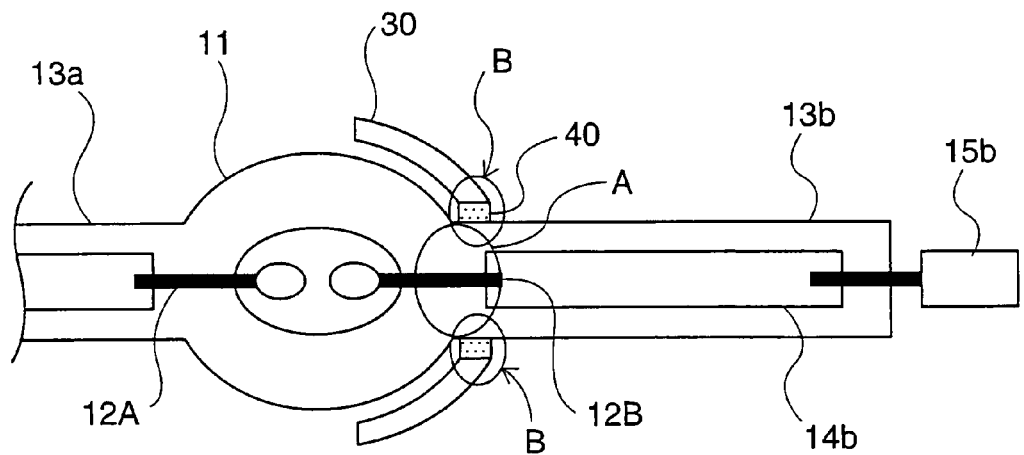
FIG. 3 is a view used to describe advantages of the lamp device of the invention in comparison with a lamp device in the related art.

In the arc tube 10, a stress is produced in a portion where the electrode axis 12B made of metal (tungsten) is sealed by quartz glass due to a difference of their coefficients of thermal expansion. For example, as is shown in FIG. 3(a) of the background art, when the sub-mirror 30 is provided in close proximity to the arc tube 10, the end of the sub-mirror 30 is positioned on the surface of the sealing portion 13b that corresponds to a portion where the electrode axis 12B is sealed. In this case, a large stress region A developed due to a difference of coefficients of thermal expansion between the electrode axis 12B and the sealing portion 13b overlaps a large stress region B developed due to a difference of coefficients of thermal expansion between the sealing portion 13b and the bonding agent 40, and stresses are concentrated in the overlapped portion.

Figure 3B:
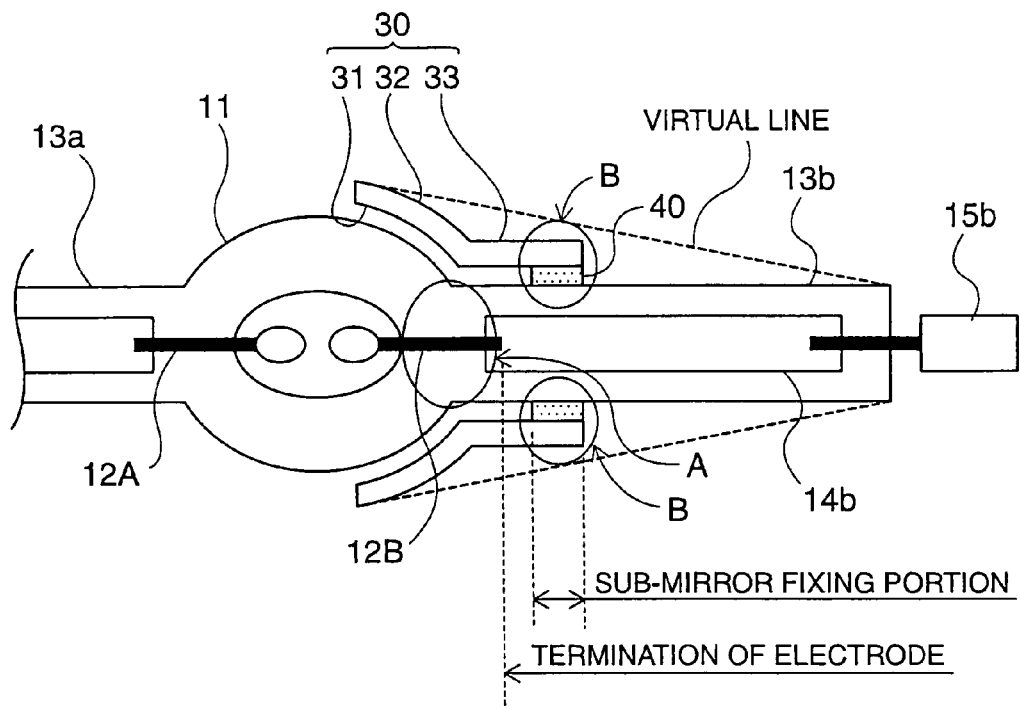

On the contrary, in FIG. 3(b) corresponding to the lamp device 1, the surface region of the sealing portion 13b present in a direction moving away from the bulb portion 11 in reference to the termination of the electrode axis 12B is allocated to the fixing portion of the sub-mirror 30 by utilizing the terminal portion of the cylinder portion 33. In this case, as is shown in the drawing, a large stress region A developed due to a difference of coefficients of thermal expansion between the electrode axis 12B and the sealing portion 13b will not overlap a large stress region B developed due to a difference of coefficients of thermal expansion between the sealing portion 13b and the bonding agent 40. Concentration of stresses in the fixing portion of the sub-mirror 30 can be thus avoided. Hence, the arc tube 10 becomes stable in strength. In this case, the fixing portion of the sub-mirror 30 overlaps a portion where the metal foil 14b is sealed. However, because the metal foil 14b is extremely thin, an influence of the stress induced from a difference of coefficients of thermal expansion between the sealing portion 13b and the metal foil 14b is almost negligible.

Optical functions of the lamp device 1 as described above are as follows. That is, the arc tube 10 gives off lights by a discharge function of the electrodes 12a and 12b, and the lights are emitted from the bulb portion 11. Of the lights emitted from the bulb portion 11, lights emitted toward the main reflection mirror 20 are reflected on the main reflection mirror 20 and head for an irradiated region. Of the lights emitted from the bulb portion 11 of the arc tube 10, lights emitted toward the sub-mirror 30 are first reflected on the sub-mirror 30 and head for the main reflection mirror 20, after which they are reflected on the main reflection mirror 20 and head for the irradiated region. Hence, in the lamp device 1, most of the lights emitted from the bulb portion 11 of the arc tube 10 can be utilized, and efficiency for light utilization can be thereby enhanced.

Figure 4:
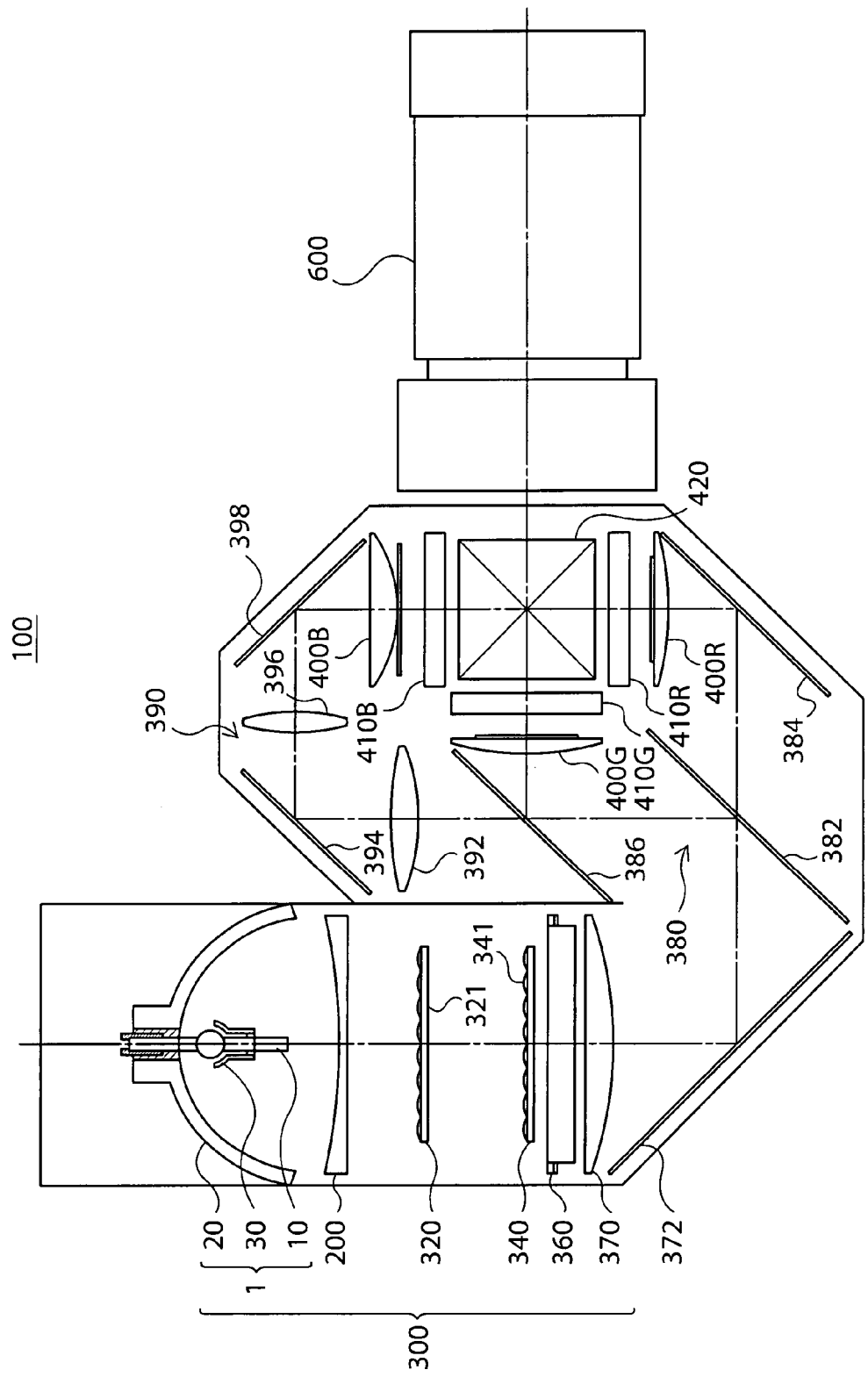
FIG. 4 is a view showing the configuration of a projector according to one exemplary embodiment of the invention.

FIG. 4 is a view showing an exemplary configuration of a projector 100 according to one exemplary embodiment of the invention. The projector 100 can include an illumination system 300, a color separation system 380, a relay system 390, liquid crystal panels 410R, 410G, and 410B, a cross dichroic prism 420, a projection lens 600, etc.

Functions of the projector 100 will now be described.

The illumination system 300 is an optical integration system to illuminate image forming regions on the liquid crystal panels 410R, 410G, and 410B almost homogeneously, and is provided with the lamp device 1 of the embodiment described above, a first lens array 320, a second lens array 340, a polarization converting element array 360, and a superimposing lens 370.

A light emitted from the arc tube 10 is first reflected on the reflection mirror 20 or both the sub-mirror 30 and the reflection mirror 20 toward an illuminated region, and goes incident on a concave lens 200 so that the traveling direction of the light is adjusted to be almost parallel to the optical axis of the illumination system 300.

The parallelized light then goes incident on respective small lenses 321 in the first lens array 320, and is divided into partial lights in the matching number with the small lenses 321. Further, the respective partial lights that come out from the first lens array 320 go incident on the second lens array 340 having small lenses 341 corresponding to the respective small lenses 321.

Lights emitted from the second lens array 340 then go incident on the polarization converting element array 360 that aligns polarization directions of these lights to make them linearly polarized lights of the same kind. Plural partial lights whose polarization directions are aligned in the polarization converting element array 360 go incident on the superimposing lens 370, and respective partial lights to go incident on the liquid crystal panels 410R, 410G, and 410B are adjusted therein to be superimposed on the corresponding panel surfaces.

Lights that come out from the superimposing lens 370 are reflected on the reflection mirror 372, and go incident on the color separation system 380. The color separation system 380 is an optical system to separate lights emitted from the illumination system 300 into lights of three colors including red, green, and blue, and is provided with dichroic mirrors 382 and 386, and a reflection mirror 384.

Of all the lights emitted from the superimposing lens 370, the first dichroic mirror 382 transmits red light components and reflects blue light components and green light components. The red light components pass through the first dichroic mirror 382 and are reflected on the reflection mirror 384, after which they reach the liquid crystal panel 410R for red lights by passing through a field lens 400R. Of the blue light components and the green light components reflected on the first dichroic mirror 382, the green light components are reflected on the second dichroic mirror 386, and reach the liquid crystal panel 410G for green lights by passing through a field lens 400G.

Meanwhile, the blue light components pass through the second dichroic mirror 386 and go incident on the relay system 390. The relay system 390 is an optical system furnished with a function of guiding blue lights having passed through the dichroic mirror 386 in the color separation system 380 to the liquid crystal panel 410B, and is provided with a light incident-side lens 392, a relay lens 396, and reflection mirrors 394 and 398. In other words, the blue light components pass through the light incident-side lens 392, the reflection mirror 394, the relay lens 396, and the reflection mirror 398, and reach the liquid crystal panel 410B for blue lights by further passing through a field lens 400B. The relay system 390 is used for blue lights for the purpose of preventing a decrease in efficiency for light utilization caused by light diffusion or the like that results from the fact that the optical path for blue lights is longer than the optical paths for the other color lights. In short, the purpose is to convey the partial lights that come incident on the light incident-side lens 392 intact to the field lens 400B. The relay system 390 is configured to allow blue lights among lights of three colors to pass through, however, it may be configured to allow color lights other than red lights to pass through.

Then, the three liquid crystal panels 410R, 410G, and 410B modulate incident lights of their respective colors according to provided image information, and form images of lights of respective colors. Normally, polarizers are provided on the light incident-side and the light exiting-side of the respective liquid crystal panels 410R, 410G, and 410B.

Then, modulated lights of respective colors emitted from the respective liquid crystal panels 410R, 410G, and 410B go incident on the cross dichroic prism 420 serving as a color combining system to form a color image by combining these modulated lights. In the cross dichroic prism 420, a dielectric multi-layer film that reflects red lights and a dielectric multi-layer film that reflects blue lights are formed at the boundaries of four rectangular prisms almost in the shape of a capital X, and lights of three colors are combined by these dielectric multi-layer films.

A color image emitted from the cross dichroic prism 420 is then scaled up and projected onto the screen by the projection lens 600.

Because the projector 100 can include the lamp device 1 as described above, the projector is improved in quality and the life thereof is extended generally as the quality of the lamp device 1 is improved.

It should be understood that the projector 100 of the invention is not limited to the exemplary embodiment above, and it can be implemented in various manners without deviating from the scope of the invention. For example, a modification as follows is possible.

In the exemplary embodiment above, two lens arrays 120 and 130 are used to divide lights from the lamp device 1 into plural partial lights. However, the invention is also applicable to a projector that does not use such lens arrays.

The exemplary embodiment was described by using a projector employing transmissive liquid crystal panels by way of example. However, the invention is not limited to this configuration, and is also applicable to a projector employing reflective liquid crystal panels. In the case of a projector employing reflective liquid crystal panels, it can comprise liquid crystal panels alone and a pair of polarizers can be omitted. In addition, with the projector employing reflective liquid crystal panels, in some cases, the cross dichroic prism is used not only as a color separating device for separating illumination lights into lights of three colors including red, green, and blue, but also as a color combining device for combining modulated lights of three colors to be emitted in the same direction. Further, a dichroic prism formed by combining plural triangular or square dichroic prisms may be used instead of the cross dichroic prism. Almost the same advantages as those attained by the projector employing transmissive liquid crystal panels can be achieved when the invention is applied to a projector employing reflective liquid crystal panels.

The invention was described by using a projector employing three liquid crystal panels as modulation devices by way of example. However, the invention is also applicable to a projector configured to use one, two, four or more liquid crystal panels.

Also, light modulation devices to generate an image by modulating incident lights are not limited to liquid crystal panels, and for example, a device using a micro mirror can also be used. Further, the lamp device of the invention is applicable to each of a front projector that projects an image from a direction in which the user views the projection surface and a rear projector that projects an image from the opposite side of a direction in which the user views the projection surface.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A lamp device, comprising:
an arc tube provided with a bulb portion, a pair of sealing portions formed continuously from the bulb portion in a longitudinal direction, a pair of electrodes encapsulated inside of the bulb portion, electrode axes sealed respectively inside of the pair of sealing portions, and conductor foils sealed respectively inside of the pair of sealing portions, each of the electrode axes having a first termination and a second termination, each of the first terminations of the electrode axes bring respectively the conductor foils into conduction, each of the electrodes being respectively at the second terminations of the electrodes;
a main reflection mirror, to which one of the pair of sealing portions is fixed, that reflects light emitted from the arc tube toward an illuminated region; and
a sub-mirror, the sub-mirror having a cup-shaped reflection base portion where a reflection surface is formed and a cylinder portion formed to extend from the reflection base portion, the reflection surface reflecting light emitted from the bulb portion toward the bulb portion, an outer diameter of the cylinder portion being smaller than an outer diameter of the cup-shaped reflection base portion, the sub-mirror being bonded with a bonding agent between the other of the pair of sealing portions and the cylinder portion, wherein the bonding agent is located in a portion away from the bulb portion and without overlapping, in the longitudinal direction, the first termination of the electrode axis.

2. The lamp device according to claim 1,
the sub-mirror including a cup-shaped reflection base portion on which the reflection surface is formed, and a cylinder portion extending from the reflection base portion in an opposite direction of a reflection direction of the reflection surface in such a manner that the sealing portion is inserted therein; and
the sub-mirror being fixed to the sealing portion by utilizing a terminal portion of the cylinder portion.

3. The lamp device according to claim 2,
the cylinder portion being located inside virtual lines linking an outermost portion of the reflection base portion and a tip-end outside portion of the sealing portion to which the cylinder portion is fixed.

4. A projector, comprising:
the lamp device according to claim 1;
a light modulation device that forms an image by modulating a light emitted from the lamp device according to image information; and
a projection lens that projects the image.

5. The projector according to claim 4,
the sub-mirror of the lamp device, including a cup-shaped reflection base portion on which the reflection surface is formed, and a cylinder portion extending from the reflection base portion in an opposite direction of a reflection direction of the reflection surface in such a manner that the sealing portion is inserted therein; and
the sub-mirror being fixed to the sealing portion by utilizing a terminal portion of the cylinder portion.

6. The projector according to claim 5,
the cylinder portion being located inside virtual lines linking an outermost portion of the reflection base portion and a tip-end outside portion of the sealing portion to which the cylinder portion is fixed.

7. A lamp device, comprising:
an arc tube that includes a bulb portion and first and second sealing portions formed continuously with the bulb portion;
first and second electrodes contained inside the bulb portion;
first and second conductor foils contained inside the arc tube;
first and second electrode axes, the first electrode axis extending between the first conductor foil and the first electrode and the second electrode axis extending between the second conductor foil and the second electrode;
a main reflection mirror, to which the first sealing portion is fixed, that reflects light emitted from the bulb portion toward an illuminated region; and
an auxiliary reflection mirror that is disposed on the second sealing portion in such a manner that the bulb portion is between the auxiliary reflection mirror and the main reflection mirror, and that reflects light emitted from the bulb portion back toward the bulb portion, the auxiliary reflection mirror being fixed to a surface region of the second sealing portion with a bonding agent, wherein the bonding agent is not located on the bulb portion and does not overlap, in a longitudinal direction of the second sealing portion, a termination of either electrode axis, wherein a first region where a stress is caused by a difference of coefficients of thermal expansion between the second electrode axis and the second sealing portion does not substantially overlap a second region where a stress is caused by a difference of coefficients of thermal expansion between the second sealing portion and the bonding agent.

8. The lamp device according to claim 7, wherein the first and second sealing portions extend in substantially opposite directions from the bulb portion.

9. The lamp device according to claim 7, wherein the first and second conductor foils are substantially contained inside the first and second sealing portions respectively.

10. A projector comprising the lamp device of claim 7, the projector further comprising:
 a modulator configured to modulate received light according to image information to form an image; and
 a projection lens that projects the image.

11. The projector according to claim 10, wherein the first and second sealing portions extend in substantially opposite directions from the bulb portion.

12. The projector according to claim 10, wherein the first and second conductor foils are substantially contained inside the first and second sealing portions respectively.

* * * * *